United States Patent
Park et al.

(10) Patent No.: US 8,203,449 B2
(45) Date of Patent: Jun. 19, 2012

(54) RF-ID TAG READING SYSTEM FOR USING PASSWORD AND METHOD THEREOF

(75) Inventors: Kyung-ho Park, Suwon-si (KR); Woo-shik Kang, Suwon-si (KR); Jin-young Yang, Seoul (KR); Hyung-min Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1213 days.

(21) Appl. No.: 11/791,081

(22) PCT Filed: Mar. 30, 2006

(86) PCT No.: PCT/KR2006/001165
§ 371 (c)(1), (2), (4) Date: May 18, 2007

(87) PCT Pub. No.: WO2006/104354
PCT Pub. Date: Oct. 5, 2006

(65) Prior Publication Data
US 2008/0169909 A1 Jul. 17, 2008

(30) Foreign Application Priority Data
Mar. 30, 2005 (KR) .................. 10-2005-0026584
Mar. 30, 2006 (KR) .................. 10-2006-0028685

(51) Int. Cl.
*G08B 13/14* (2006.01)
(52) U.S. Cl. .................. 340/572.1; 340/10.1; 340/10.3; 340/10.5; 340/10.51; 340/5.3
(58) Field of Classification Search .................. 340/10.5
See application file for complete search history.

(56) References Cited

U.S. PATENT DOCUMENTS

| | | | | |
|---|---|---|---|---|
| 4,970,504 A | * | 11/1990 | Chen | 340/5.26 |
| 5,008,661 A | * | 4/1991 | Raj | 340/10.51 |
| 5,469,363 A | | 11/1995 | Saliga | |
| 5,528,222 A | * | 6/1996 | Moskowitz et al. | 340/572.7 |
| 6,753,759 B2 | * | 6/2004 | Stegmaier et al. | 340/10.51 |
| 2002/0110379 A1 | * | 8/2002 | Reihl et al. | 399/12 |

(Continued)

FOREIGN PATENT DOCUMENTS
JP 2000-339420 A 12/2000
(Continued)

OTHER PUBLICATIONS

Office Action dated Sep. 28, 2010 from the Japanese Patent Office in counterpart Japanese application No. 2008-503953.

*Primary Examiner* — Benjamin C Lee
*Assistant Examiner* — Curtis King
(74) *Attorney, Agent, or Firm* — Sughrue Mion, PLLC

(57) ABSTRACT

Provided is a RFID tag with enhanced security. The tag includes a tag memory to store thereto pre-determined password information and tag data, an antenna to receive a tag data transmission request signal from an outer reader, and a tag controller to request the reader to transmit the password if the tag data transmission request signal is received, and then to transmit the tag data if the password received from the reader is identical with the pre-determined password. Accordingly, it can be prevented for a third-party, who does not know the password, to check the tag data.

18 Claims, 5 Drawing Sheets

U.S. PATENT DOCUMENTS

| | | | |
|---|---|---|---|
| 2004/0054900 A1* | 3/2004 | He | 713/168 |
| 2004/0066278 A1* | 4/2004 | Hughes et al. | 340/10.1 |
| 2004/0130448 A1* | 7/2004 | McDonald et al. | 340/572.1 |
| 2005/0007236 A1* | 1/2005 | Lane et al. | 340/5.86 |
| 2005/0212676 A1* | 9/2005 | Steinberg | 340/572.8 |
| 2006/0010302 A1* | 1/2006 | Yamamoto et al. | 711/163 |
| 2006/0087407 A1* | 4/2006 | Stewart et al. | 340/10.52 |
| 2006/0181396 A1* | 8/2006 | Uchida et al. | 340/10.51 |
| 2006/0192653 A1* | 8/2006 | Atkinson et al. | 340/5.61 |
| 2006/0255131 A1* | 11/2006 | Stewart | 235/383 |
| 2006/0261926 A1* | 11/2006 | Zimmerman et al. | 340/10.1 |
| 2007/0109124 A1* | 5/2007 | Park et al. | 340/572.1 |
| 2008/0165005 A1* | 7/2008 | Burbridge et al. | 340/572.1 |

FOREIGN PATENT DOCUMENTS

| | | |
|---|---|---|
| JP | 2001-117661 A | 4/2001 |
| JP | 2003-337928 A | 11/2003 |
| JP | 2004-326210 A | 11/2004 |
| WO | 2006/075485 A1 | 7/2006 |

* cited by examiner

[Fig. 1]
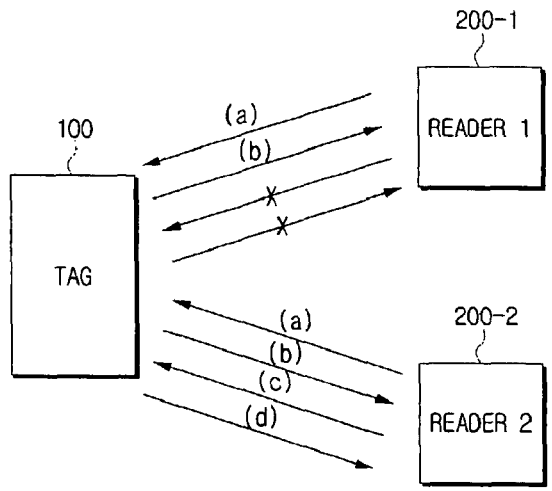
[Fig. 2]
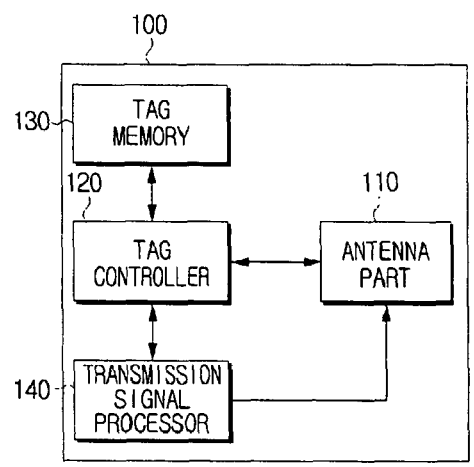
[Fig. 3]
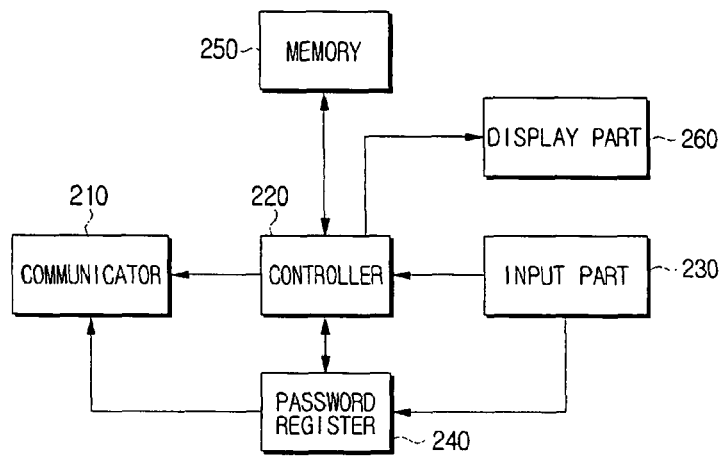

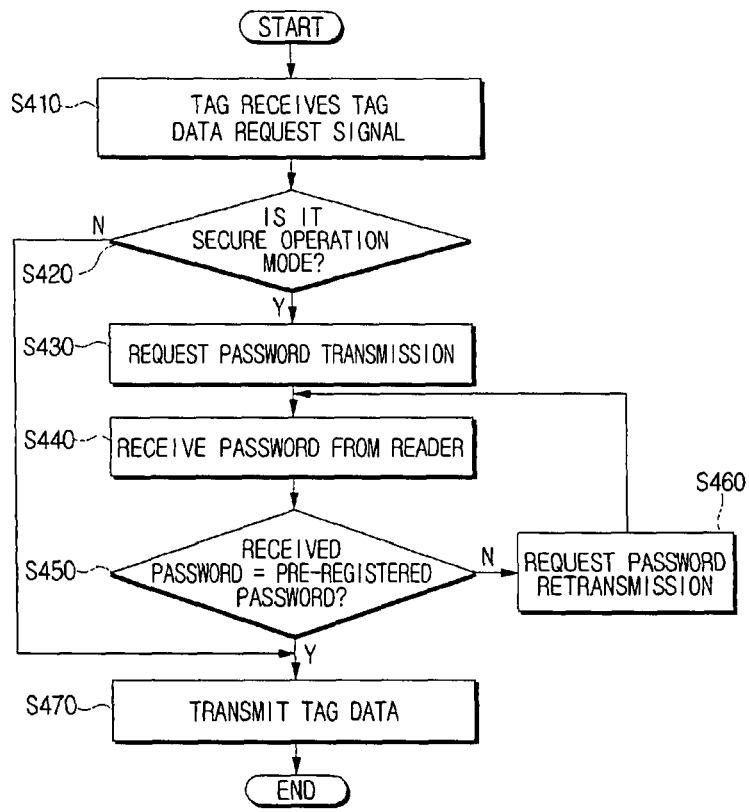
[Fig. 4]
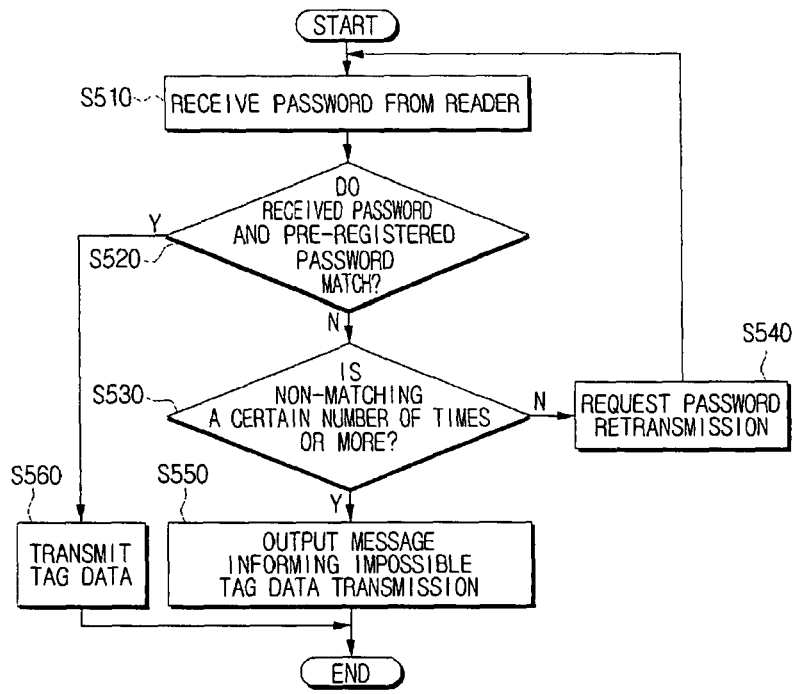
[Fig. 5]

[Fig. 6]
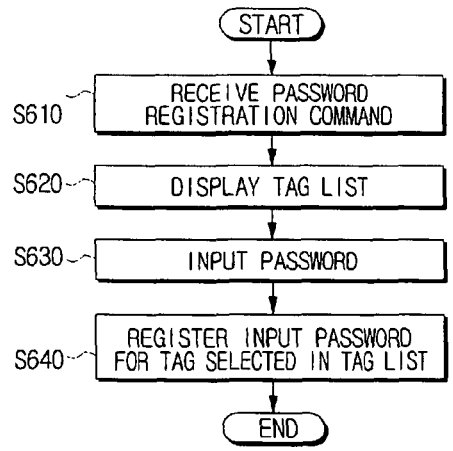
[Fig. 7]
| BYTE ADDRESS | FIELD NAME |
|---|---|
| 0 | OPERATION MODE |
| 1 ~ 8 | PASSWORD |
| 9 ~ 16 | Tag ID |
| 17 ~ 18 | Tag Manufacturer |
| 19 ~ 20 | Tag Hardware Type |
| 21 ~ 26 | Tag Memory Layout |
| 27 ~ | User Data |
[Fig. 8]
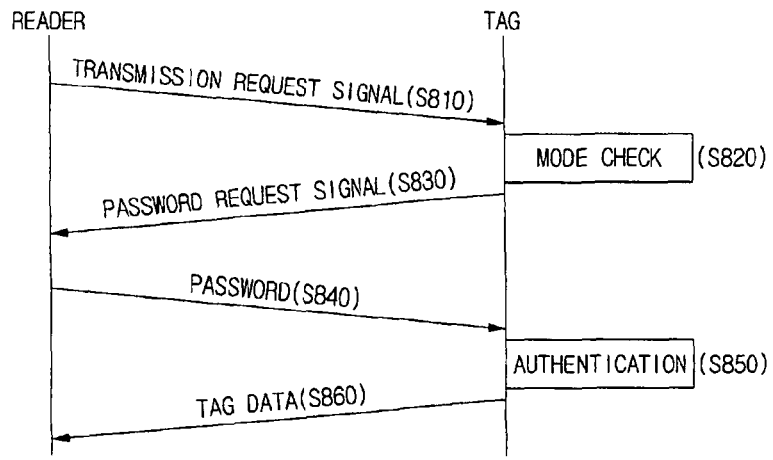

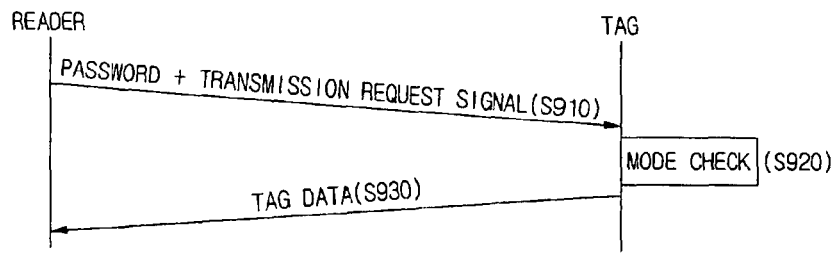
[Fig. 9]
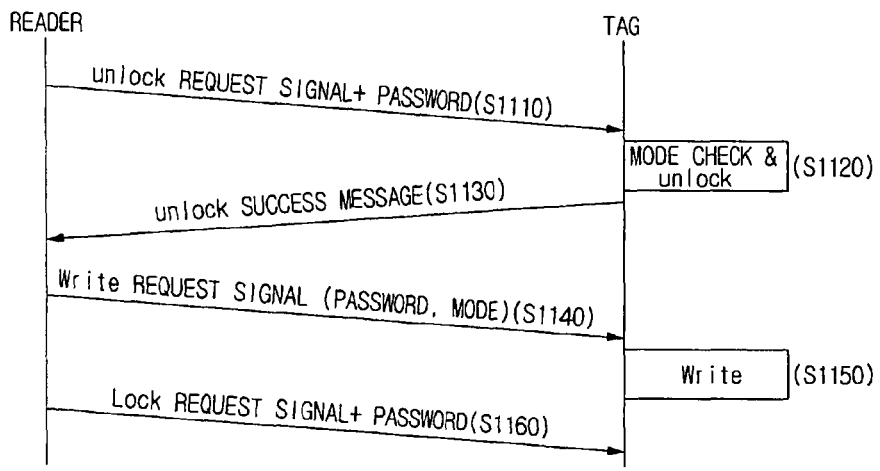
[Fig. 10]
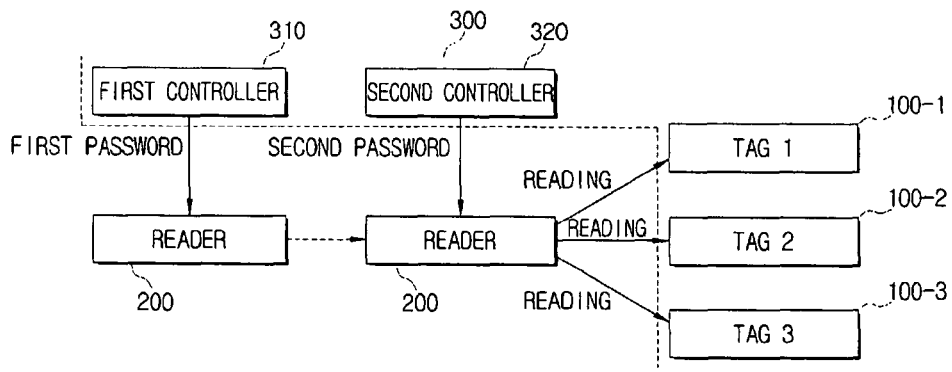
[Fig. 11]

[Fig. 12]
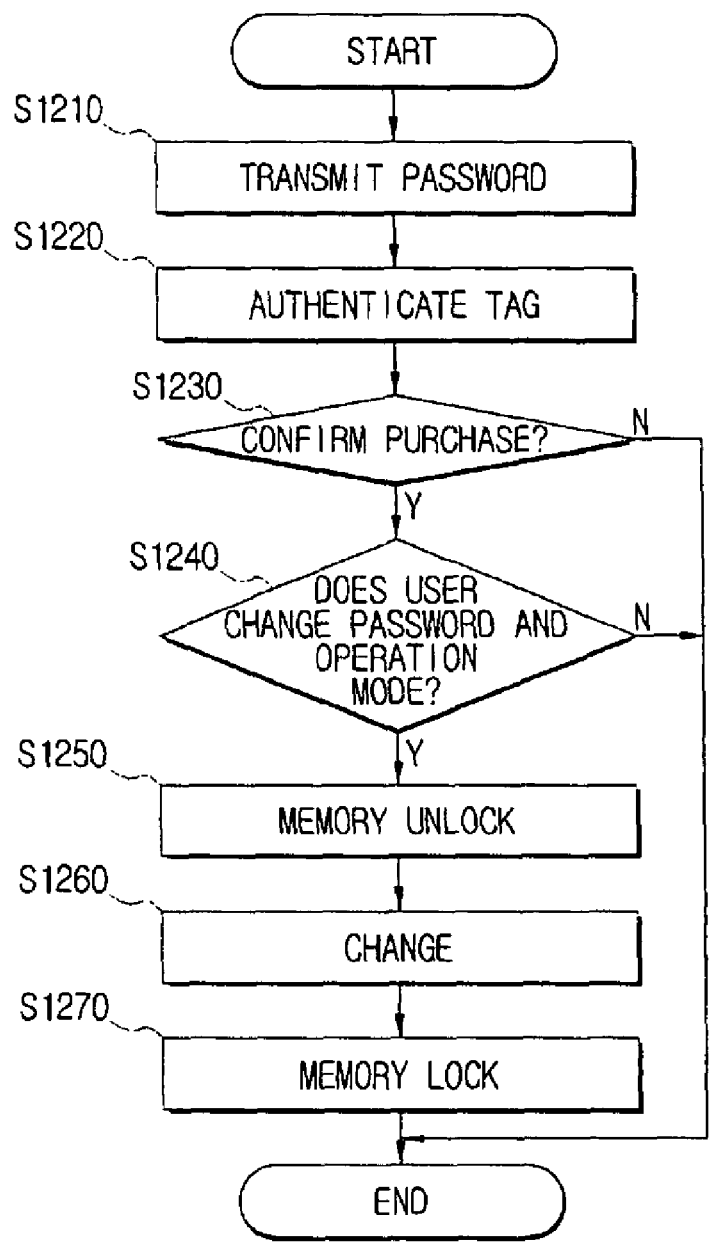

RF-ID TAG READING SYSTEM FOR USING PASSWORD AND METHOD THEREOF

TECHNICAL FIELD

The general inventive concept relates to an RFID tag reading system including an RFID tag and an RFID reader, and a method thereof, more specifically, to an RFID tag reading system including an RFID tag and an RFID reader, which has a security function of determining whether or not to read tag data using a password, and a method thereof.

BACKGROUND ART

Today, due to developed wireless technologies, diverse RFID tag reading systems ranging from a prepayment bust card to a parking lot pass and a laboratory pass are used. The RFID tag reading system includes a tag and a reader. The RFID tag reading system operates in the method that if the reader requests tag data transmission to the tag, the tag transmits tag data to the reader in the form of a radio frequency. The reader can be formed in terminals such as a cell phone, a PDA, and a laptop computer. The tag can be implemented in the form of a card which a user can carry such as a pass, and a bus card, or can be implemented in the form of a sticker which is attached to a product to transmit product information.

Meanwhile, according to the method of driving an IC embedded in the tag, there are two types of RFID systems. An active tag supplies power from a battery embedded in the tag, and a passive tag generates an induced current using a magnetic wave transmitted from the RFID reader. Passive tags in the form of a slim and light-weight card are generally used. As the passive tag does not need a battery, it can be miniaturized and low-priced. Accordingly, tags attached to a general product is implemented with passive tags.

DISCLOSURE OF INVENTION

Technical Problem

According to a coventional RFID system, if a tag receives an electromagnetic from a neighboring reader, the tag outputs a transmission signal containing tag data stored in its memory. Subsequently, a plurality of neighboring readers can receive the tag data. In this case, a reader of an unauthorized user can also receive the tag data. As a result, the security of the tag data stored in the tag is not guaranteed. Particularly, if a user buys and carries a product, another can identify the tag data of the tag attached to the product. Therefore, the privacy of the user having the product can be invaded.

Technical Solution

An aspect of embodiments of the present invention is to solve at least the above problem or disadvantage and to provide at least the advantages described below. Accordingly, an aspect of embodiments of the present invention is to provide an RFID tag reading system including an RFID tag, which guarantees individual privacy by transmitting tag data only when a preset password is input, and reinforcing security of the tag data, and an RFID reader, and a method thereof.

Another aspect of embodiments of the present invention is to provide an RFID shopping system including a tag which performs authentication using a password, and a wireless authentication method thereof.

An RFID tag comprises a tag memory which stores preset password information and tag data, an antenna part which receives a transmission request signal for the tag data from an external reader, and a tag controller which requests password transmission to the reader if the transmission request signal is received, and transmits the tag data to the reader if the password transmitted from the reader and the preset password match.

The RFID tag further comprises a transmission signal processor which generates a transmission signal to transmit to the reader, wherein the tag controller generates a password request signal which requests the password transmission if the transmission request signal is received, and controls the transmission signal processor and the antenna part to transmit the password request signal to the reader.

The tag controller controls the transmission signal processor and the antenna part to retransmit the password request signal to the reader if the password transmitted from the reader and the preset password do not match.

The tag controller generates an alarm signal informing a reading try for the tag data and controls the transmission signal processor and the antenna part to emit the alarm signal, if the password transmitted from the reader and the preset password do not match a certain number of times or more.

The RFID tag further comprises an output part which outputs a message, wherein the tag controller controls the output part to output an alarm message if the password transmitted from the reader and the preset password do not match the certain number of times or more.

The tag controller sets an area of the memory where the preset password information and tag data are stored in a lock state.

The tag memory stores a first password information which authenticastes a tag data reading right, and a second password information which which authenticastes the tag data reading right and a lock state setting change right.

A reader which reads an RFID tag comprises an input part which receives a reading command for a tag, a communicator which communicates with the tag, and a controller which controls the communicator to transmit a transmission request signal for tag data stored in the tag, and a password information to read the tag data to the tag.

The controller transmits the password information to the tag if a password request signal is received from the tag, after transmitting the transmission request signal.

The controller transmits one of a password input through the input part and a preset password to the tag.

The reader further comprises a password register which generates a password registration request signal containing information on the password to register, if a password registration command and the password to register are input through the input part.

The reader further comprises a memory which stores information on at least one tag, and a display part which displays a list of the at least one tag and a password input window, if the password registration command is input, wherein the password registration part generates the password registration request signal containing a first password information which is input through the password input window, and transmits the password registration request signal to a first tag which is selected from the list.

An RFID tag reading system comprises a tag which stores a preset first password information and tag data, and a reader which transmits a transmission request signal for the tag data and a second password information to the tag, wherein the tag transmits the tag data to the reader, if the first password and the second password match.

The tag requests retransmission of the second password, if the first password and the second password do not match.

The tag outputs an alarm message informing impossible transmission for the tag data, if the first password and the second password do not match a certain number of times or more.

A tag reading method in an RFID tag reading system comprising a tag and a reader comprises (a) the reader transmits a tag data request signal to the tag, (b) the tag requests password transmission to the reader, (c) the reader transmits a password to the tag, and (d) the tag compares a preset password and the password transmitted from the reader, and transmits the tag data to the reader if the two passwords match.

In operation (b), the tag determines its operation mode, and if its operation mode is a general operation mode, the tag transmits the tag data to the reader, or if its operation mode is a secure operation mode, the tag requests password transmission to the reader.

The method further comprises the tag requests password retransmission to the reader, if the preset password and the password transmitted from the reader do not match, the tag counts the number of non-matching of the two passwords, and the tag outputs an alarm message informing impossible transmission of the tag data, if the counted number of non-matching is over a certain number of times.

The method further comprises the tag generates an alarm signal informing a reading try for the tag data, if the preset password and the password transmitted from the reader do not match, and the tag emits the alarm signal.

The method further comprises the reader receives a password to register, if a password registration command is input to the reader, and the reader generates a password registration request signal containing information on the password to register, and registers the password by transmitting the password registration request signal to neighboring tags.

The method further comprises displaying a list of at least one tag to register a password, and registering the password by transmitting a password registration request signal containing the password to register to a selected tag, if a tag is selected from the list.

An RFID tag comprises a tag memory which stores operation mode information and password information, and a tag controller which confirms the operation mode information if a tag data transmission request signal is received, and determines whether to output tag data according to the confirmed result.

The tag controller outputs the tag data if the operation mode information is a general operation mode, or the tag controller performs authentication using the password information if the operation mode information is a secure operation mode, and determines whether to output the tag data according to the authentication result.

An RFID system comprises a first controller which transmits a first password for only tag reading operation to a reader, a tag which stores a preset password information and tag data, performs authentication using the preset password if a transmission request signal for the tag data and the first password information are received from the reader, and transmits the tag data to the reader after finishing the authentication, and a second controller which transmits a second password, which allows password information of the tag and operation mode information to be changed, to the reader, if purchase of a product attached with the tag is confirmed.

A wireless authentication method of an identification (ID) system comprises transmitting a password to perform tag reading to a reader if the reader is within a certain distance, the tag performs authentication using the password and the preset password if the reader transmits the password and a tag data transmission request signal to the tag, and transmits tag data to the reader if the authentication is finished, canceling lock state of the tag, and changing at least one of the password and the operation mode information, if purchase of the tag is confirmed, and setting an area, where the changed password and operation mode information are stored, in a lock state, if the change is finished.

ADVANTAGEOUS EFFECTS

As described above, an RFID tag according to the present invention is input with a password, tag data are transmitted to an RFID reader only when the password is the same as a password from the RFID reader. Accordingly, the security is reinforced, and individual privacy can be protected. In addition, in case that somebody tries tag reading, the owner of the tag can instantly notice by an alarm message or an alarm signal that the tag reading is tried. An RFID system according to the present invention can be applied to diverse environments such as a shopping system or a content providing system.

BRIEF DESCRIPTION OF THE DRAWINGS

FIG. 1 is a schematic diagram illustrating the configuration of an RFID tag reading system according to an exemplary embodiment of the present invention;

FIG. 2 is a block diagram illustrating the configuration of an RFID tag according to an exemplary embodiment of the present invention;

FIG. 3 is a block diagram illustrating the configuration of an RFID reader according to an exemplary embodiment of the present invention;

FIG. 4 is a flow chart illustrating an RFID tag reading method according to an exemplary embodiment of the present invention;

FIG. 5 is a flow chart illustrating an RFID tag reading method according to another exemplary embodiment of the present invention;

FIG. 6 is a flow chart illustrating a method of registering a password of an RFID tag according to an exemplary embodiment of the present invention;

FIG. 7 is a schematic diagram illustrating an example of the configuration of the tag memory in the RFID tag of FIG. 2;

FIGS. 8 and 9 are mimetic diagrams illustrating a signal transmission flow between the reader and the tag in the RFID system of FIG. 1;

FIG. 10 is a mimetic diagram illustrating a signal transmission flow to lock or unlock a region to store a password and an operation mode;

FIG. 11 is a block diagram illustrating the configuration of an RFID shopping system using the RFID system of FIG. 1; and FIG. 12 is a flow chart illustrating a wireless authentication method of the RFID shopping system using the RFID system of FIG. 1.

DESCRIPTION OF THE REFERENCE NUMERALS IN THE DRAWINGS

100: tag 110: antenna part
120: tag controller 130: tag memory
140: transmission signal processor 210: communicator
220: controller 230: input part
240: password register 250: memory
260: display part 200: reader

BEST MODE FOR CARRYING OUT THE INVENTION

Hereinafter, exemplary embodiments of the present invenetion will be described in detail with reference to the accompanying drawing figures.

FIG. 1 is a schematic diagram illustrating the configuration of an RFID tag reading system according to an exemplary embodiment of the present invention. According to FIG. 1, the RFID tag reading system includes a tag 100 and a plurality of readers 200_1 and 200_2.

The tag 100 contains a memory (not shown). The memory stores tag data and a pre-registered first password. The tag data are diverse information (product information, personal information and a tag ID) on a product (or a tag owner) which the tag 100 is attached to.

If a first reader 200_1 of the plurality of readers transmits a tag data transmission request signal (a), the tag 100 requests a password transmission to the first reader 200_1 (b). The tag data transmission request signal may be a carrier signal containing a message which requests tag data transmission, or a simple electromagnetic wave to generate an induced current from a coil in the tag 100. Meanwhile, in spite of the password transmission request (b), if the first reader 200_1 does not transmit the password to the tag 100, the tag 100 does not transmit the tag data.

Meanwhile, if a second reader 200_2 requests tag data transmission to the tag 100 (a), the tag 100 requests a password transmission to the second reader 200_2 (b). Accordingly, the second reader 200_2 transmits the password to the tag 100 (c), the tag 100 compares the received password and the pre-registered password to confirm whether they matches. As a result, if they matches, the tag 100 tranmits the tag data to the second reader 200_2 (d). Accordingly, only the second reader 200_2 which knows the exact password can confirm the tag data.

The reader in the RFID tag reading system of FIG. 1 may be a portable device having a RFID tag reading function, or a device fixed on a building.

FIG. 2 is a block diagram illustrating the configuration of the tag 100 according to an exemplary embodiment of the present invention. According to FIG. 2, the tag 200 includes an antenna part 110, a tag controller 120, a tag memory 130 and a transmission signal processor 140.

The antenna part 110 receives a signal transmitted from an external reader, or transmits a signal generated in the transmission signal processor 140. The antenna part 110 may be a coil. Accordingly, if an electromagnetic wave is received from the external reader, the antenna part 110 can generate an induced current to supply to the tag controller 120.

The tag memory 130 stores tag data and password information.

If tag data transmission request is received, the tag controller 120 requests password transmission to the reader. More specifically, the tag controller 120 generates a password transmission request signal by controlling the transmission signal processor 140, and transmits the password transmission request signal to the reader through the antenna part 110.

If the password information is transmitted from the reader, the password information is compared with the password information stored in the tag memory 130. If those passwords match, the tag controller 120 controls the transmission signal processor 140 to transmit the tag data to the reader. That is, the transmission signal processor 140 generates a transmission signal by modulating the tag data, and transmits the signal to the reader.

If those passwords do not match, the tag controller 120 controls the transmission signal processor 140 to request password retransmission. As a result, if a password is retransmitted, the password is compared with the pre-registered password to determine whether to transmit a password.

Meanwhile, if those passwords do not match again, the tag controller 120 counts the number of non-matching. If non-matching consecutively occurs a certain number of times or more, the tag controller 120 controls the transmission signal processor 140 to generate an alarm signal. Accordingly, the alarm signal is transmitted to a reader of an authenticated user so that the authenticated user can notice that an unauthenticated user tries reading. In this case, the tag controller 120 can control the transmission signal processor 140 to transmit the alarm signal informing the reader trying reading of non-authority.

Alternatively, the tag 100 may further include an output part (not shown). In this case, if the passwords do not match a certain number of times or more, the tag controller 120 controls the output part to output an alarm message to inform tag data transmission to be impossible. The output part may be a red LED or a speaker. The alarm message is expressed by flickering the LED or ringing the alarm.

Meanwhile, the tag controller 120 can change the operation mode according to the user's selection. The operation mode of the tag controller 120 can be set to one of a general operation mode and a secure operation mode. If the secure operation mode is selected, whether to transmit the tag data is determined using the password as described above. If the general operation mode is selected, the tag data are directly transmitted without requesting the password. Such operation modes can be set by user's inputting a mode selection command using a reader. The information on the operation mode and the password information respectively can be recorded in a certain area of the tag memory 130 and utilized. In this case, the memory area where the information on the operation mode and the password information are recorded is locked, so that an unauthorized user cannot change the information on the operation mode and the password information. Such configuration of the tag memory 130 will be described soon.

FIG. 3 is a block diagram illustrating the configuration of a portable device 200 having an RFID tag reading function according to an exemplary embodiment of the present invention. According to FIG. 3, the portable device 200 includes a commmunicator 210, a controller 220, an input part 230, a password register 240, a memory 250, and a display part 260. The portable device 200 is a reader applied to a variety of portable electronic devices such as a cell phone, a PDA, and a laptop computer.

The communicator 210 receives a signal transmitted from an RFID tag, or transmis a signal. To this end, the communicator 210 can be implemented with an antenna or modulation and demodulation circuit.

The input part 230 receives a command from a user. The user can input various commands by pressing buttons formed on a main body of the portable device or inputting a voice signal. More specifically, a reading command of the RFID tag, a mode setting command, and a password registration command can be input to the input part 230. Accordingly, if the reading command is input, the input part 230 notifies it to the controller 220.

If the reading command is input from the input part 230, the controller 220 controls the commmunicator 210 to transmit a tag data transmission request signal to the tag. As described above, if the tag is set in the secure operation mode, the tag requests a password.

Accordingly, if the password request signal is received, the controller 220 transmits the password information to the tag. The password information may be a password input by a user, or a preset password. More specifically, the preset password may be a cell phone number (if the portable device is a cell phone), a serial number of the portable device, or a residential number of the user.

Meanwhile, if the password information is a password input by the user, the controller 220 receives the password request signal, and controls the display part 260 to display a window to input a password. The display part 260 may be a display element such as an LCD. Therefore, if the user input a password through the input part 230, the input password is transmitted to the tag. Consequently, if those passwords match and the tag data are transmitted to the reader, the controller 220 controls the display part 260 to display the tag data.

Meanwhile, in order to set the tag in the secure operation mode, a password has to be previously registered. The password register 240 registers a password for a tag. To this end, the memory 250 stores information on a tag to register its password.

If a password registration command for a tag is input to the controller 220 through the input part 230, the controller 220 controls the display part 260 to display a list of tag information stored in the memory 250. If a first tag is selected from the list, the display part 260 displays a password input window to input a password. Subsequently, a first password is input through the password input window, the password register 240 generates a password registration request signal to transmit to the first tag. The password registration request signal contains information on the first password to register the first password to the first tag.

Alternatively, if a password registration command for a tag is input to the controller 220, the password register 240 directly receives a password without designating a tag. If the password is input, a password registration request signal containing the password are transmitted in the neighborhood. Accordingly, a password for neighboring tags is registered all at once.

FIG. 4 is a flow chart illustrating an RFID tag reading method according to an exemplary embodiment of the present invention. According to FIG. 4, if a tag receives a tag data transmission request signal (S410), the tag determines whether to be a secure operation mode (S420). If the present mode is the secure operation mode, the tag requests password transmission to the reader which transmitted the tag data transmission request signal (S430). If the tag receives a password from the reader (S440), the tag determines if the received password and a preset password match (S450). If they do not match, the tag requests password retransmission to the reader (S460). On the other hand, if they match, the tag transmits the tag data to the reader (S470).

FIG. 5 is a flow chart illustrating an RFID tag reading method according to another exemplary embodiment of the present invention. According to FIG. 5, the tag receives a password from the reader (S510), and compares the password and the preset password (S520). If they match, the tag transmits the tag data to the reader (S560). On the other hand, if they do not match, the tag counts the number of non-matching (S530). As a result, if the number of non-matching is less than a certain number of times, the tag requests password retransmission (S540). On the other hand, if the number of non-matching is a certain number of times or more, the tag outputs an alarm message notifying impossible tag data transmission. The alarm message can be expressed by flickering the LED or ringing the alarm, as described above. In addition, if there is a reader of an authenticated user around the tag, the reader can output an alarm signal informing the tag data reading try. Alternatively, the tag can recognize non-authendication by outputting an alarm message to the reader which tries tag data reading.

FIG. 6 is a flow chart illustrating a method of registering a password of an RFID tag according to an exemplary embodiment of the present invention. According to FIG. 6, if a password registration command is input to a reader (S610), the reader executes an application program to register a password. The reader may be a portable device having a RFID tag reading function, or a device fixed on a building.

Accordingly, the reader displayes a list of tags to register a password (S620). The user can select a tag to register a password from the list. After a tag is selected, if a password to register is input by the user (S630), input password information is transmitted and registered to the corresponding tag (S640). Accordingly, if an owner of a reader purchases a product attached with a tag, the onwer can register a password by designating the tag of the product.

Meanwhile, accordingn to another example of registering a password, if a password registration command is input and an application program to register a password is executed, a password input window can be directly displayed. Accordingly, if a password is input, a password registration request signal containing the input password is transmitted to the neighborhood. Neighboring tags which receives the password registration request signal registers the received password to its memory. Consequently, the onwer of the reader can register the password to the plurality of tags which belongs to the owner at once. As a result, this prevents others from noticing the information on the products phurchased by the owner.

FIG. 7 is a schematic diagram illustrating an example of the configuration of the tag memory in the tag 100 of FIG. 2.

According to FIG. 7, the first field consists of one byte (0th byte), and stores operation mode information. More specifically, the secure operation mode can be recorded as 0x01, and the general operation mode can be recorded as 0x00. The tag controller 120 determines the operation mode by confirming data of the first field. The second field consists of 8 bytes (1th~8th bytes), and stores password information.

The configuration of the memory of the existing tag can be appilded to the third field and so on. According to FIG. 7, a tag ID, a tag fabricater, a tag hardware type, a tag memory layout, and user data are stored. FIG. 7 exemplifies the configuration of a memory of an ISO 18000-6 Type C tag, but memories of other standards can be applied. Additionally, in FIG. 7, the operation mode information and password information respectively are recorded in the first and second field, but can be also recorded in the last two fields or center fields of the memory.

Meanwhile, the tag controller 120 can lock the area where the password information and operation mode information are stored in the tag memory 130. In this case, other people cannot change the password information and operation mode information. Using such feature, this RFID system can be utilized in various environments such as a shopping mall and a pay content providing system. The detailed description on this will be made soon.

FIGS. 8 and 9 are mimetic diagrams illustrating a signal transmission flow between the reader 200 and the tag 100 in the RFID system according to an exemplary embodiment of the present invention. According to FIG. 8, the reader outputs a transmission request signal (S810). The tag 100 determines the present operation mode in response to the transmission request signal (S820). If the present operation mode is the general operation mode, the tag 100 directly transmits tag data to the reader 200. On the other hand, if the present operation mode is the secure operation mode, the tag 100 transmits a password request signal to the reader 200 (S830). Subsequetly, if the owner of the reader 200 inputs a password or there exists a preset password, the reader 200 transmits the password to the tag 100 (S840). The tag 100 compares the received password and a password stored in the tag to perform authentication (S850). If the authentication is finished, the tag data is transmitted to the reader 200 (S860). However, if the authentication is unsuccessful, a password retransmission signal is transmitted to the reader 200.

FIG. 9 is a mimetic diagram illustrating the case that the reader 200 outputs a transmission request signal containing a password. If the transmission request signal containing a password is transmitted (S910), the tag 100 determines the present operation mode (S920). Accordingly, if the present operation mode is the general operation mode, the tag 100 directly transmits tag data to the reader 200. On the other hand, if the present operation mode is the secure operation mode, the tag 100 detects the password from the transmission request signal, and compares the password and a password stored in the tag 100 to perform authentication. If the authentication is finished, the tag data is transmitted to the reader 200 (S930). However, if the authentication is unsuccessful, the tag 100 requests password retransmission or transmits an alarm message informing the unsuccesful authentication result to the reader 200.

FIG. 10 is a mimetic diagram illustrating the lock or unlock operation between the reader 200 and the tag 100. According to FIG. 10, the reader 200 transmits a unlock request signal containing a password to the tag 100 (S1110). After the tag 100 determines the present operation mode (S1120), if the present operation mode is the general operation mode, the tag 100 directly outputs a successful unlock message (S1130). On the other hand, if the present operation mode is the secure operation mode, the tag 100 perform authentication using the received password, unlocks the corresponding memory area after finishing the authentication, and outputs a successful unlock message (S130). At this time, if the authentication is unsuccessful, the tag 100 can request password retransmission to the reader 200.

Meanwhile, if it is in the unlocked state, the reader 200 can change the operation mode and the password of the tag 100. To change these information, the reader 200 transmits a write request signal containing new information on the password or the operation mode to the tag 100 (S1140). The tag 100 changes information on the password or the operation mode stored in a certain area of the memory using the information included in the write request signal. If the information change is finished, the reader 200 transmits a lock request signal containing the new password to the tag (S1160) in order to lock the corresponding area. Accordingly, other people cannot change the password and operation mode information.

The above exemplary embodiments can be utilized in various environments such as a shopping mall and a pay content providing system. Hereinafter, the examples utilizing the RFID system according to the general inventive concept of the present invention will be described in detail.

FIG. 11 is a block diagram illustrating the configuration of an RFID shopping system using the RFID system. The shopping system 300 of FIG. 11 can be applied to a department store or a big shopping mall. The shopping system 300 includes a first controller 310, tags 100_1 through 100_3, and a second controller 320. The configuration of each of the tags 100_1 through 100_3 may follow the configuration of the tag in FIG. 2. Meanwhile, a fabricator of each of the tags 100_1 through 100_3 sets the area storing a password and an operation mode of each of the tags 100_1 through 100_3 as an unlock state and provides the tags to a manager of the shopping system 300. The manager attaches each of the tags 100_1 through 100_ to each product, and sets the area storing the password and operation mode in the lock state. Each tag stores its product information as tag data. Therefore, users outside of the building utilizing this shopping system 300 cannot read the features of each product.

In this state, a first controller 310 is installed at the front door of the building, and automatically gives a first password to readers 200 (or a cell phone, a portable reader) which enters via the front door. The application program installed in the reader 200 stores the first password transmitted from the first controller 310 in the memory (not shown) of the reader 200. In this case, perferably, it is impossible to change the tag information in a person's disposition by giving a tag data reading right for the first password.

In this state, if the owner of the reader 200 inputs a command to read the tags 100_1 through 100_3, the reader 200 transmits the first password and the transmission request signal to each of the tags 100_1 through 100_3. Accordingly, each of the tags 100_1 through 100_3 performs authentication using the received first password, and provides the tag informaton to the reader 200.

In this state, after the owner of the reader 200 purchases a product attached with a tag (for example, 100_1), the second controller 320 transmits a second password to the reader 200. The second password is a password with a right which can unlock the locked area of the memory of the tag 100_1 and change data. Accordingly, the owner of the reader 200, who purchased products, can change the password in order for other people not to read the information on the purchased products. Additionally, the owner can change the present operation mode to the general operation mode in order for other people to read the information.

Meanwhile, the shopping system 300 can maintain each of the tags 100_1 through 100_3 in the unlock state, notify a certain password to the owner of the reader 200 when the phurchase is confirmed, and set tag 100_1 in the lock state. In this case, the password notified to the owner of the reader 200 ha s a changing right as well as a reading right.

Alternatively, in the shopping system 300, a purchaser can cancel the lock state of the tag 100_1 when the phurchase is confirmed, input a new password to the tag, and then set the lock state again. In this exemplary embodiment, the second controller 320 of FIG. 11 can lock or unlock each of the tags 100_1 through 100_3, and store the second password to the tag 100_1. Detailed operation is described with reference to FIG. 12.

FIG. 12 is a flow chart illustrating a wireless authentication method of the RFID shopping system according to an exemplary embodiment of the present invention. According to FIG. 12, a first controller 310 transmits a password to readers 200 within a certain distance from the first controller 310 (S1210).

Subsequently, the reader 200 reads tag data of each of the tags 100_1 through 100_3 using the password (S1220).

If the owner of the reader 200 decides to purchase a tag 100_1 (S1230), the owner changes the password and the operation mode information (S1240). More specifically, the second controller 320 cancels the lock state of the tag 100_1 (S1250), and changes the present information to new information (S1260). That is, the new second password requested by the user is stored in the tag 100_1, or the present operation mode is changed to the general operation mode or secure operation mode. After the change is finished, the second controller 320 sets again the memory of the tag 100_1 in the lock state (S1270).

Accordingly, this prevents other people from reading or changing data of the tag 100_1.

Meanwhile, the RFID system according to the general inventive concept of the present invention can be applied to a content providing business. That is, a content provider records tag data to a tag manufactured by a tag manufacturer, sets the operation mode in the secure operation mode, records the password, and distributes the tags. Receives content purchase requests from users via an SMS, an application or a phone call, the content provider allows the user to read the data by transmitting the password to the user. Accordingly, woman-only contents, movies for over age 18, and contents for members can be selectively utilized.

While the invention has been shown and described with reference to certain embodiments thereof, it will be understood by those skilled in the art that various changes in form and details may be made therein without departing from the spirit and scope of the invention as defined by the appended claims.

Industrial Applicability

This inventive concept can be applied to various devices having a function of reading an RFID tag, such as a cell phone, a PDA, and a laptop computer, and also can be implemented with a shopping system to sell products attached with the RFID tag.

The invention claimed is:

1. An RFID tag, comprising:
   a tag memory which stores preset password information and tag data;
   an antenna part which receives a transmission request signal for the tag data from an external reader of a portable device;
   a tag controller which requests password transmission to the reader if the transmission request signal is received, and transmits the tag data to the reader if the password transmitted from the reader and the preset password match; and
   a transmission signal processor which generates a transmission signal to transmit to the reader,
   wherein the tag controller generates a password request signal which requests the password transmission if the transmission request signal is received, and controls the transmission signal processor and the antenna part to transmit the password request signal to the reader,
   wherein the tag controller controls the transmission signal processor and the antenna part to retransmit the password request signal to the reader if the password transmitted from the reader and the preset password do not match, and
   wherein the preset password includes at least one of a cell phone number, a serial number of the portable device and a residential number of a user.

2. The RFID tag of claim 1, wherein the tag controller generates an alarm signal informing a reading try for the tag data and controls the transmission signal processor and the antenna part to emit the alarm signal, if the password transmitted from the reader and the preset password do not match a certain number of times or more.

3. The RFID tag of claim 2, further comprising an output part which outputs a message,
   wherein the tag controller controls the output part to output an alarm message if the password transmitted from the reader and the preset password do not match the certain number of times or more.

4. The RFID tag of claim 1, wherein the tag controller sets an area of the memory where the preset password information and tag data are stored in a lock state.

5. The RFID tag of claim 4, wherein the tag memory stores a first password information which authenticates a tag data reading right, and a second password information which authenticates the tag data reading right and a lock state setting change right.

6. A reader which reads an RFID tag, comprising:
   an input part which receives a reading command for a tag;
   a communicator which communicates with the tag; and
   a controller which controls the communicator to transmit a transmission request signal for tag data stored in the tag, and password information to read the tag data to the tag, the password information including at least one of a cell phone number, a serial number of a portable device and a residential number of a user, the reader being included in the portable device,
   wherein the communicator receives a password request signal from the tag and the controller transmits the password information to the tag if the password request signal is received from the tag, after transmitting the transmission request signal, and receives from the tag a retransmitted password request signal if the password transmitted from the reader and a preset password stored in the tag do not match.

7. The reader of claim 6, wherein the controller transmits one of a password input through the input part and a preset password to the tag.

8. The reader of claim 6, further comprising a password register which generates a password registration request signal containing information on the password to register, if a password registration command and the password to register are input through the input part.

9. The reader of claim 8, further comprising:
   a memory which stores information on at least one tag; and
   a display part which displays a list of the at least one tag and a password input window, if the password registration command is input,
   wherein the password registration part generates the password registration request signal containing a first password information which is input through the password input window, and transmits the password registration request signal to a first tag which is selected from the list.

10. An RFID tag reading system, comprising:
    a tag which stores a preset first password information and tag data; and
    a reader which transmits a transmission request signal for the tag data and a second password information to the tag,
    wherein the tag receives the transmission request signal for the tag data from the reader, generates a password request signal which requests password transmission and transmits the password request signal to the reader if the transmission request signal is received, and transmits the tag data to the reader, if the first password and the second password match,
    wherein the reader generates and transmits the transmission request signal to the tag, receives the password request signal from the tag and the transmits the second password to the tag if the password request signal is received from the tag, after transmitting the transmission request signal, and
    wherein the tag retransmits the password request signal to the reader if the first password and the second password do no match, and the reader receives from the tag the retransmitted password request signal, wherein the preset password includes at least one of a cell phone number, a serial number of a portable device and a residential number of a user, and wherein the reader is included in the portable device.

11. The RFID tag reading system of claim 10, wherein the tag outputs an alarm message informing impossible transmission for the tag data, if the first password and the second password do not match a certain number of times or more.

12. A tag reading method in an RFID tag reading system comprising a tag and a reader of a portable device, the method comprising:

(a) the reader transmits a tag data request signal to the tag;
(b) the tag generates a password request signal which requests password transmission if the tag data request signal is received;
(c) the reader receives the password request signal from the tag and transmits a password to the tag;
(d) the tag compares a preset password and the password transmitted from the reader, and transmits the tag data to the reader if the two passwords match; and
(e) the tag requests password retransmission to the reader, if the preset password and the password transmitted from the reader do not match,
wherein the preset password includes at least one of a cell phone number, a serial number of the portable device and a residential number of a user.

13. The method of claim 12, further comprising:
the tag counts the number of non-matching of the two passwords; and
the tag outputs an alarm message informing impossible transmission of the tag data, if the counted number of non-matching is over a certain number of times.

14. The method of claim 12, further comprising:
the tag generates an alarm signal informing a reading try for the tag data, if the preset password and the password transmitted from the reader do not match; and
the tag emits the alarm signal.

15. The method of claim 12, further comprising:
the reader receives a password to register, if a password registration command is input to the reader; and
the reader generates a password registration request signal containing information on the password to register, and registers the password by transmitting the password registration request signal to neighboring tags.

16. The method of claim 15, further comprising:
displaying a list of at least one tag to register a password; and
registering the password by transmitting a password registration request signal containing the password to register to a selected tag, if a tag is selected from the list.

17. An RFID system, comprising:
a first controller which transmits a first password for only tag reading operation to a reader of a portable device;
a tag which stores a preset password and tag data, determines an operation mode of the tag, transmits the tag data to the reader without performing authentication if the operation mode is a general operation mode, performs authentication using the preset password if the operation mode is a secure operation mode whereby the tag is in a lock state and if a transmission request signal for the tag data and the first password information are received from the reader, and transmits the tag data to the reader after finishing the authentication, the preset password including at least one of a cell phone number, a serial number of the portable device and a residential number of a user; and
a second controller which transmits a second password to the reader, which allows the password of the tag and operation mode to be changed in the tag memory when the second password is received by the tag from the reader if purchase of a product attached with the tag is confirmed,
wherein the lock state of the tag is being canceled upon authentication to change the password and operation mode in response to receiving the second password and the changed password and operation mode in the tag memory in the lock state.

18. A wireless authentication method of an identification (ID) system, comprising:
Transmitting, by a controller of the ID system, a password to perform tag reading to a reader of a portable device if the reader is within a certain distance;
determining, by a tag an operation mode of the tag, transmitting the tag data to the reader without performing authentication if the operation mode is a general operation mode, performing authentication using the password and a preset password stored in the tag if the operation mode is a secure operation mode whereby the tag is in a lock state and if the reader transmits the password and a tag data transmission request signal to the tag, and transmitting tag data to the reader in response to the authentication, the preset password including at least one of a cell phone number, a serial number of the portable device and a residential number of a user;
canceling the lock state of the tag, and changing the password and the operation mode, if purchase of a product attached with the tag is confirmed by the controller of the ID system; and
setting an area in a tag memory, where the changed password and operation mode are stored, in a lock state.

* * * * *